US008107210B2

(12) United States Patent
Chang et al.

(10) Patent No.: US 8,107,210 B2
(45) Date of Patent: Jan. 31, 2012

(54) MAGNETIC ACTUATOR SYSTEM AND CONTROL METHOD THEREOF

(75) Inventors: Sean Chang, Taoyuan Hsien (TW); Chii-How Chang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 1252 days.

(21) Appl. No.: 11/505,340

(22) Filed: Aug. 17, 2006

(65) Prior Publication Data
US 2007/0091508 A1 Apr. 26, 2007

(30) Foreign Application Priority Data

Oct. 20, 2005 (TW) ................. 94136666 A

(51) Int. Cl.
*H01H 47/02* (2006.01)
(52) U.S. Cl. ....................... 361/139
(58) Field of Classification Search .......... 361/139
See application file for complete search history.

(56) References Cited

U.S. PATENT DOCUMENTS 5,258,874 A * 11/1993 Bajat et al. .......... 359/894
5,267,144 A * 11/1993 Yoshida et al. .......... 700/69
6,660,997 B2 * 12/2003 Laberge et al. .......... 250/231.18
2002/0168130 A1 * 11/2002 Chaparala .......... 385/16

* cited by examiner

*Primary Examiner* — Jared Fureman
*Assistant Examiner* — Nicholas Ieva
(74) *Attorney, Agent, or Firm* — Birch, Stewart, Kolasch & Birch, LLP

(57) ABSTRACT

A control method of the magnetic actuator system includes the following steps. A first initial orientation step is to move a magnetic actuator to a first position in accordance with a first position signal, and generate a first position sense signal by a position sensor. A second initial orientation step is to move the magnetic actuator to a second position in accordance with a second position signal, and generate a second position sense signal by the position sensor. An orientation step is to perform an interpolation in accordance with the above signals and a target position signal to obtain a target position sense signal. A moving step is to move the magnetic actuator to an actual position in accordance with the target position signal, and output an actual position sense signal by the position sensor. An adjustment step is to move the magnetic actuator to a target position in accordance with the target position sense signal and the actual position sense signal.

19 Claims, 5 Drawing Sheets

MAGNETIC ACTUATOR SYSTEM AND CONTROL METHOD THEREOF

BACKGROUND OF THE INVENTION

1. Field of Invention

The invention relates to a magnetic actuator system and a control method thereof and, in particular, to a linear magnetic actuator system and a control method thereof.

2. Related Art

Technological advances have brought in higher demands in image capturing and processing. The conventional iris diaphragm that uses a magnet and a magnetic position sensor converts the magnetic flux sensed by the magnetic position sensor into a voltage output signal. However, an inappropriate structural design may result in a nonlinear relation between the magnetic flux (or voltage) and the magnet position. Therefore, it requires a nonlinear driving device and method to make corrections. This increases the complexity and cost of the structure. Alternatively, the iris diaphragm may use several magnets to compensate with one another to make the magnetic flux sensed by the magnetic position sensor is as linear as possible. Even so, the great number of components also will increase the complexity, the cost of the structure, and the production time.

Accordingly, the product of prior art using the magnets and magnetic position sensor for orientation is necessary to fine-tune the positions of the magnets and the magnetic position to make the magnetic flux (or voltage) and the magnet positions satisfy a predetermined curve stored in a microprocessor of the product. However, every element has its own tiny inaccuracy in size and scale, which will result in some assembling errors in the product. Thus, the conventional method of fine-tuning the positions of elements in the product will increase the production time and cost.

Therefore, it is an important subject to simplify the orientation of the magnets and magnetic position sensor to reduce the production cost and time.

SUMMARY OF THE INVENTION

In view of the foregoing, the invention is to provide a magnetic actuator system and a control method thereof to reduce the production cost and time.

To achieve the above, a control method of a magnetic actuator system of the invention utilizes a magnetic actuator and a position sensor. The position sensor outputs a position sense signal in accordance with the position of a magnetic element of the magnetic actuator. The method includes the following steps of a first initial orientation step, a second initial orientation step, an orientation step, a moving step and an adjustment step. The first initial orientation step is to move the magnetic actuator to a first position in accordance with a first position signal, and to generate a first position sense signal by the position sensor. The second initial orientation step is to move the magnetic actuator to a second position in accordance with a second position signal, and to generate a second position sense signal by the position sensor. The orientation step is to perform an interpolation in accordance with the first position signal, the first position sense signal, the second position signal, the second position sense signal, and a target position signal so as to obtain a target position sense signal. The moving step is to move the magnetic actuator to an actual position in accordance with the target position signal, and to output an actual position sense signal by the position sensor. The adjustment step is to move the magnetic actuator to a target position in accordance with the comparison of the target position sense signal and the actual position sense signal.

In addition, the invention also discloses a magnetic actuator system, which includes a magnetic actuator, a position sensor, and a microprocessor. The position sensor outputs a position sense signal in accordance with a position of a magnetic device of the magnetic actuator. The microprocessor drives the magnetic actuator and stores a first position signal, a first position sense signal, a second position signal, a second position sense signal, and an interpolation equation.

As mentioned above, the magnetic actuator system and the control method thereof of the invention use the first position signal, the first position sense signal, the second position signal, and the second position sense signal to define two end points. With the application of linear interpolation, the motion of the magnetic actuator can be controlled to be essentially linear. This also simplifies the control method, reduces the production time, and lowers the production cost. With appropriate control in the adjustment step, the magnetic actuator can be correctly moved to the target position.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
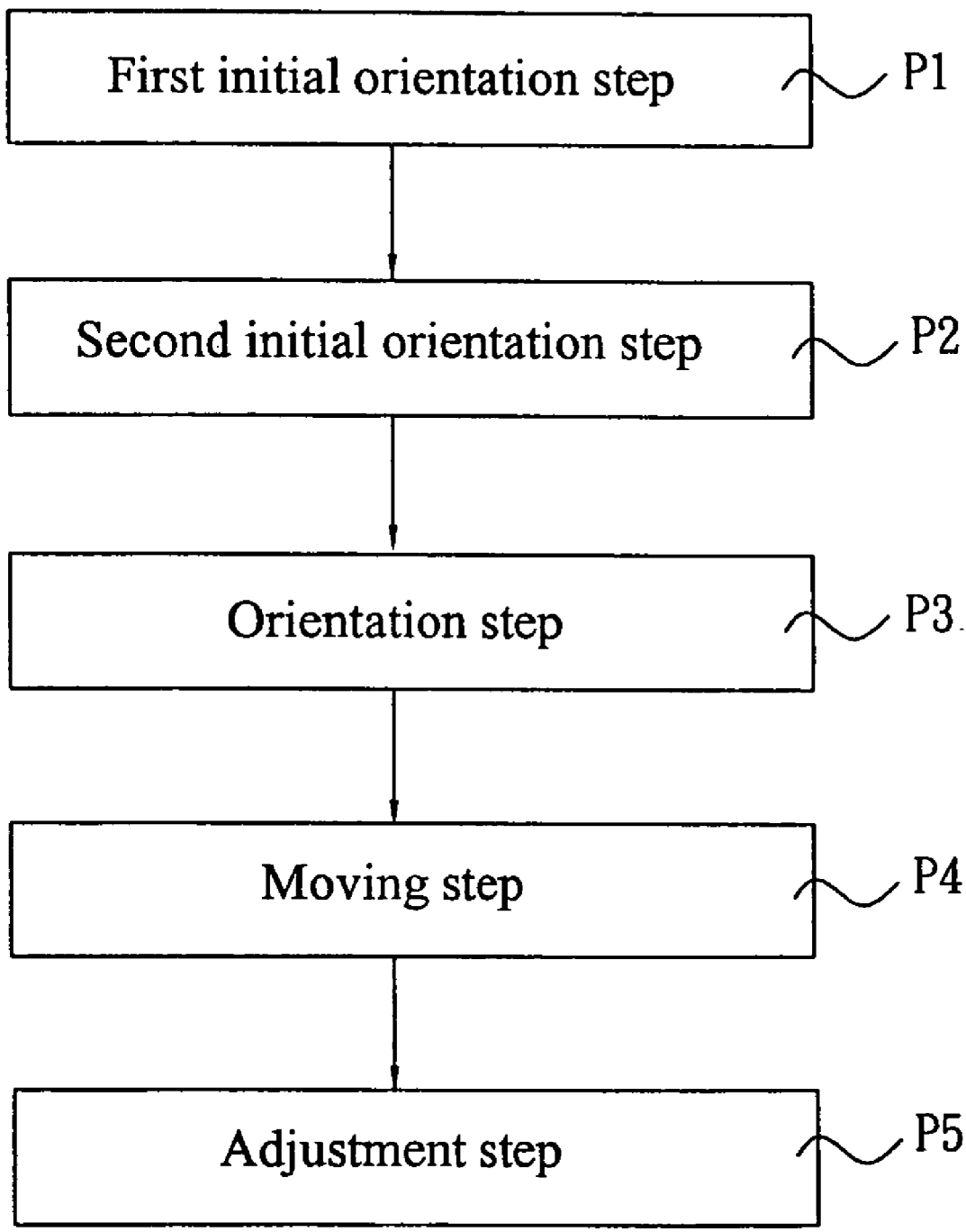
FIG. 1 is a flowchart of a control method of a magnetic actuator system according to a preferred embodiment of the invention.

As shown in FIG. 1, a control method of a magnetic actuator system according to an embodiment of the invention includes a first initial orientation step P1, a second initial orientation step P2, an orientation step P3, a moving step P4, and an adjustment step P5.

An iris diaphragm actuator is used in this embodiment to explain the magnetic actuator system and the control method thereof of the invention. With reference to FIG. 2B, the iris diaphragm actuator 2 includes a light intercepting element 20, a magnetic actuator 21, a position sensor 22, and a limiting element 23. The magnetic actuator 21 includes a magnetic device 211 and a driving device 212. The control method of the magnetic actuator system also can be applied to a Digital Light Processing (DLP) projector with DYNAMIC BLACK or SMOOTH PICTURE technology. DYNAMIC BLACK and SMOOTH PICTURE technology are proposed by Texas Instruments and usually utilized in DLP applications.

The position sensor 22 outputs a position sense signal in accordance with the position of the magnetic device 211 of the magnetic actuator 21. The position sensor 22 can be a magnetic position sensor that outputs the position sense signal according to the sensed magnetic flux of the magnetic device 211. In this embodiment, the position sensor 22 is a non-contact magnetic position sensor, which does not contact the magnetic actuator 21. For example, it can be a Hall sensor or a magnetoresistive sensor.

Figure 2A:
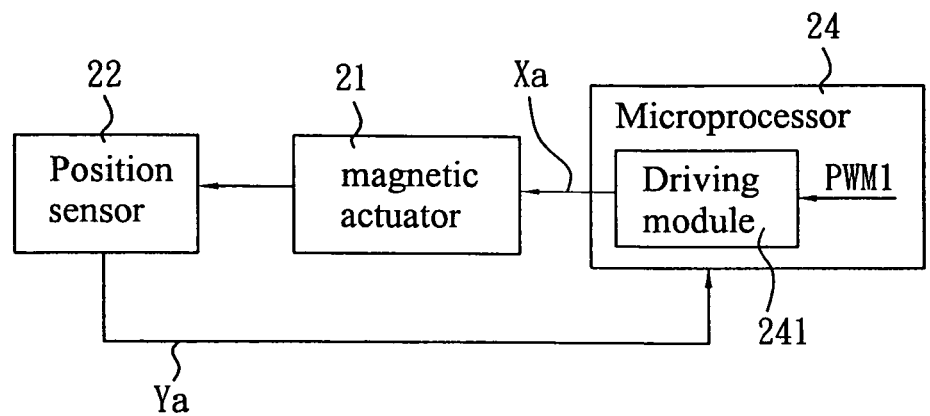
FIG. 2A is a block diagram of the magnetic actuator system in a first initial orientation step.
Figure 2B:
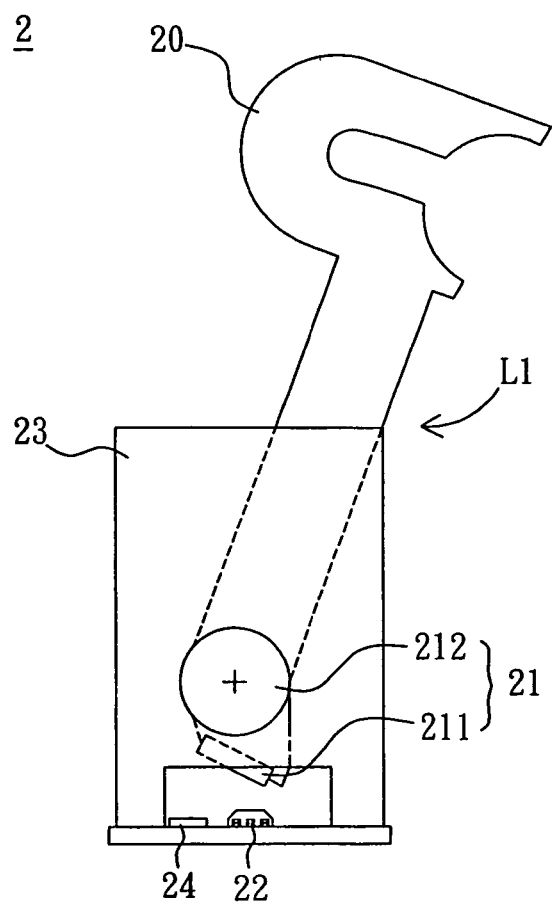
FIG. 2B is a schematic view showing the hardware implementing the step of FIG. 2A.

Also with reference to FIG. 2A, the first initial orientation step P1 is to move the magnetic actuator 21 to a first position L1 in accordance with a first position signal Xa. Then, the position sensor 22 generates a first position sense signal Ya.

The limiting element 23 is used to restrict the motion of the light intercepting element 20; when the driving device 212 moves the light intercepting element 20 to contact one side of the limiting element 23, the contact position is the first position L1. The first position signal Xa, a voltage or a current signal, is generated after a driving module 241 of a microprocessor 24 receives a first pulse width modulation signal PWM1. After the position sensor 22 generates the first position sense signal Ya, the first position signal Xa and the first position sense signal Ya are stored in the microprocessor 24.

Figure 3A:
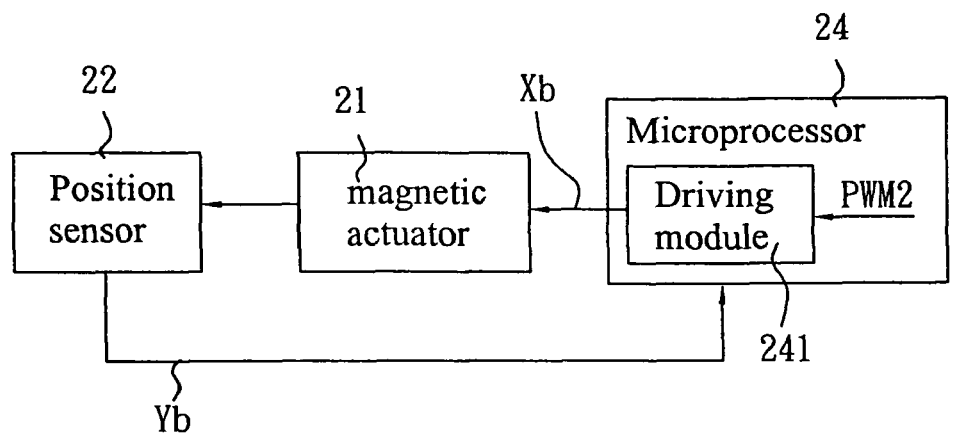
FIG. 3A is a block diagram of the magnetic actuator system in a second initial orientation step.
Figure 3B:
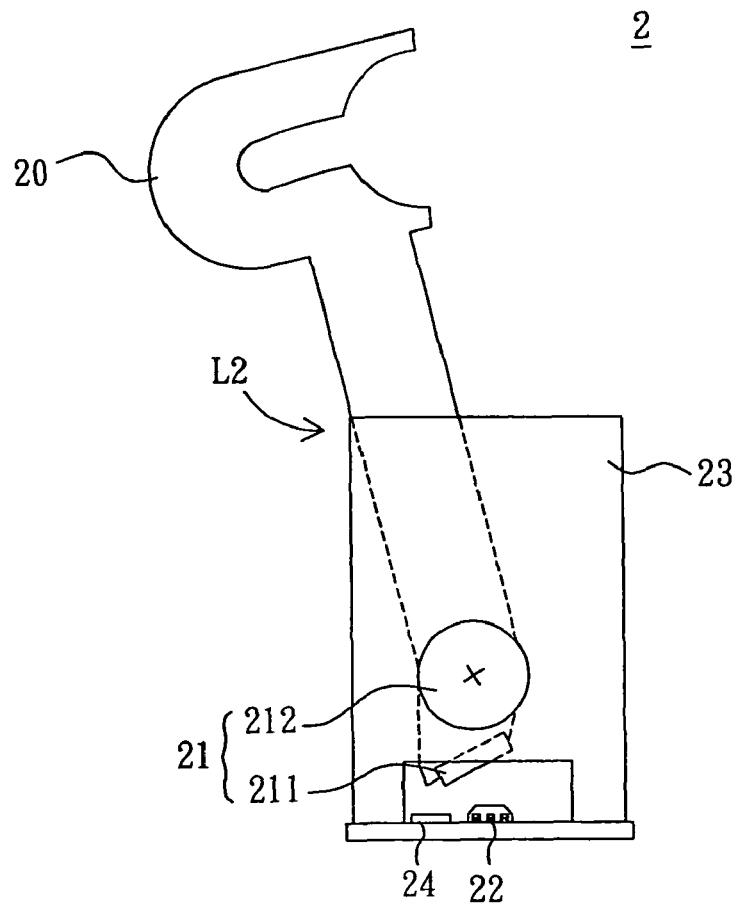
FIG. 3B is a schematic view showing the hardware implementing the step of FIG. 3A.

With reference to FIGS. 3A and 3B, the second initial orientation step P2 is to move the magnetic actuator 21 to a second position L2 in accordance with a second position signal Xb, and then the position sensor 22 generates a second position sense signal Yb. In this embodiment, when the driving device 212 moves the light intercepting element 20 to contact the other side of the limiting element 23, the contact position is the second position L2. Note that the first position L1 and the second position L2 can be any other positions in the limiting element 23. The second position signal Xb, a voltage or a current signal, is generated after the driving module 241 of the microprocessor 24 receives a second pulse width modulation signal PWM2. After the position sensor 22 generates the second position sense signal Yb, the second position signal Xb and the second position sense signal Yb are also stored in the microprocessor 24.

Figure 4A:
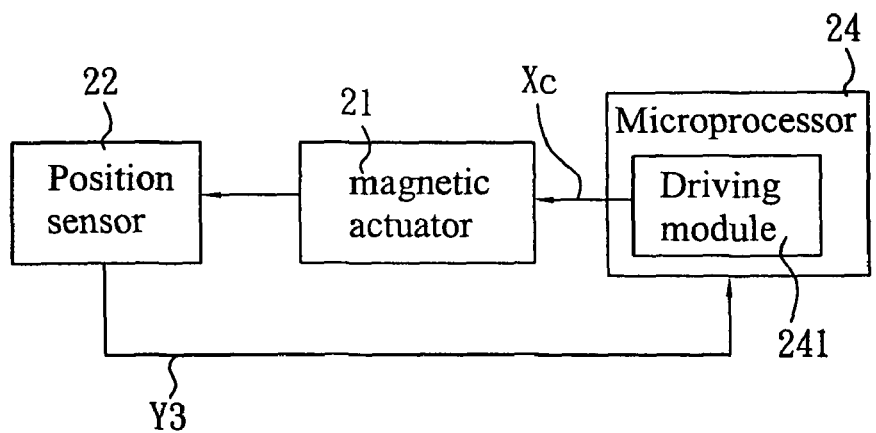
FIG. 4A is a block diagram of the magnetic actuator system in a orientation step and a moving steps.
Figure 4B:
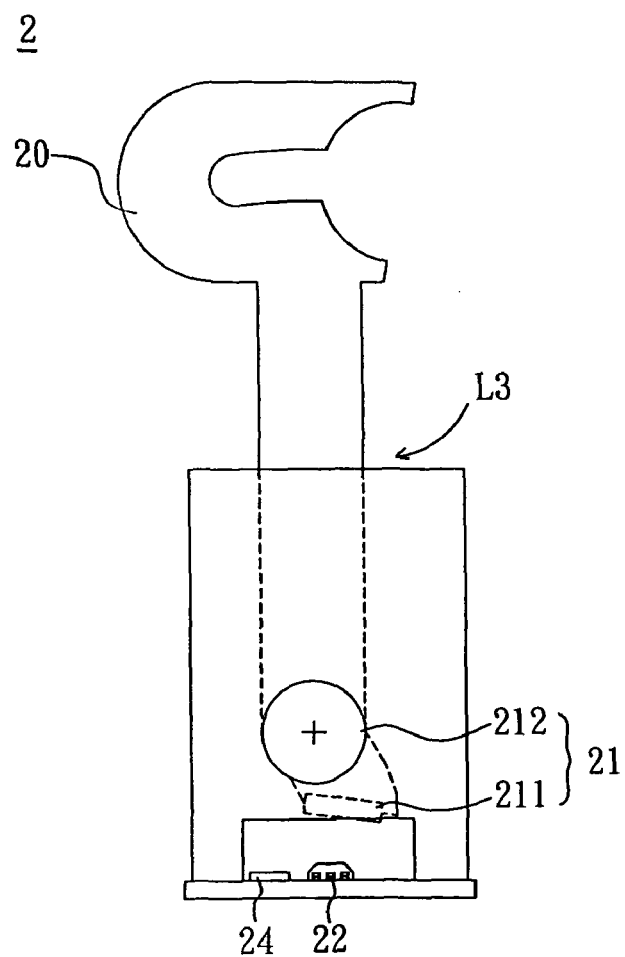
FIG. 4B is a schematic view showing the hardware implementing the steps of FIG. 4A.
Figure 5:
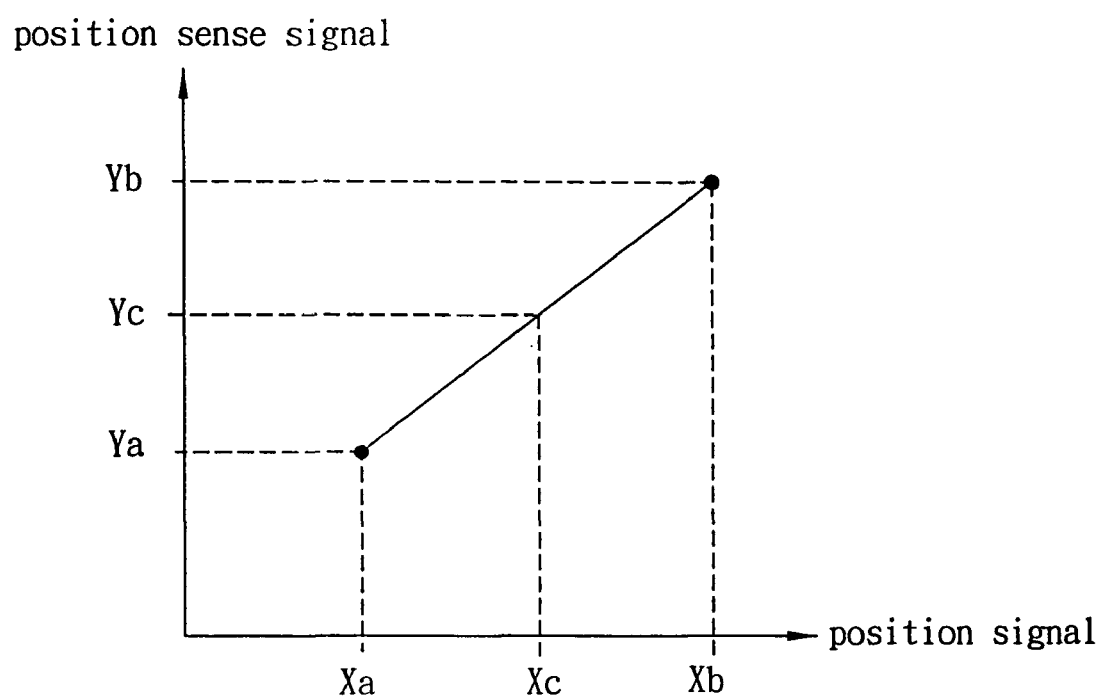
FIG. 5 is a graph showing the relation between a position signal and a position sense signal according to the control method of the invention.

With reference to FIGS. 4A and 4B, the orientation step P3 uses the first position signal Xa, the first position sense signal Ya, the second position signal Xb, the second position sense signal Yb, and a target position signal Xc to perform an interpolation to obtain a target position sense signal Yc. In this embodiment, the interpolation is a linear interpolation as Eq. (1):

$$Y = Ya + (X-Xa)*(Yb-Ya)/(Xb-Xa) \quad \text{Eq. (1)}$$

where Ya is the first position sense signal, Yb is the second position sense signal, Xa is the first position signal, Xb is the second position signal, Y is the position sense signal, and X is the position signal. In this embodiment, the target position signal Xc substitutes for the position signal X in Eq. (1) to obtain a target position sense signal Yc stored in the microprocessor 24. The linear interpolation is executed in the microprocessor 24. The driving module 241 is a linear driving module to drive the magnetic actuator 21 to move. As shown in FIG. 5, the microprocessor 24 uses the first position signal Xa, the second position signal Xb, the first position sense signal Ya, and the second position sense signal Yb to obtain two points in the X-Y plane. A linear relation is then obtained by the linear interpolation. This linear relation is used to control the motion of the magnetic actuator 21 linearly, moving the light intercepting element 20 to the target position.

The moving step P4 is to move the magnetic actuator 21 to an actual position L3 in accordance with the target position signal Xc. The position sensor 22 outputs an actual position sense signal Y3 in accordance with the actual position L3 of the magnetic device 211 of the magnetic actuator 21 to the microprocessor 24.

Nevertheless, because the mechanical actions of the magnetic actuator 21 may have some errors, the light intercepting element 20 may be moved to an undesired position. The following procedure is adopted to move the magnetic actuator 21 to the target position.

The adjustment step P5 is to correct the position of the magnetic actuator 21 in accordance with the comparison of the target position sense signal Yc and the actual position sense signal Y3, and move the magnetic device 211 of the magnetic actuator from the actual position L3 to the target position. In this embodiment, the adjustment step P5 utilizes a proportion control, an integration control, a derivative control, or a fuzzy control to move the magnetic device 211 of the magnetic actuator 21 from the actual position L3 to the target position. The light intercepting element 20 is thus located at the target position. The proportion control, the integration control, and the derivative control are commonly used in the industry and academy as the proportional-integral-derivative (PID) controller, the proportional-derivative (PD) controller, or the proportional-integral (PI) controller, so descriptions thereof is omitted herein.

In summary, the magnetic actuator system and the control method thereof of the invention use the first position signal, the first position sense signal, the second position signal, and the second position sense signal to define two end points. With the application of linear interpolation, the motion of the magnetic actuator can be controlled linearly. This also simplifies the control method, reduces the production time, and lowers the production cost. With appropriate control in the adjustment step, the magnetic actuator can be more accurately moved to the target position.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A control method of a magnetic actuator system having a light intercepting element, a magnetic actuator, a position sensor and a limiting element, comprising the steps in sequence of:

an initial step to define two end points corresponding to the operative range of the magnetic actuator, comprising:

moving the magnetic actuator to a first position in accordance with a first position signal corresponding to one of the end points such that the light intercepting element contacts one side of the limiting element;

generating a first position sense signal by the position sensor while the light intercepting element contacts one side of the limiting element;

storing the first position signal and the first position sense signal to a microprocessor;

moving the magnetic actuator to a second position in accordance with a second position signal corresponding to the other one of the end points such that the light intercepting element contacts the other side of the limiting element;

generating a second position sense signal by the position sensor while the light intercepting element contacts the other side of the limiting element;
storing the second position signal and the second position sense signal to the microprocessor;
an orientation step to perform an interpolation in accordance with the first position signal, the first position sense signal, the second position signal, the second position sense signal, and a target position signal so as to obtain a target position sense signal by the microprocessor;
a moving step to move the magnetic actuator to an actual position in accordance with the target position signal;
a sensing step to output an actual position sense signal in accordance with the actual position by the position sensor; and
an adjustment step to move the magnetic actuator from the actual position to a target position in accordance with the comparison of the target position sense signal and the actual position sense signal.

2. The control method of claim 1, wherein the interpolation is a linear interpolation with an equation as follows:

$$Y=Ya+(X-Xa)*(Yb-Ya)/(Xb-Xa)$$

where Ya is the first position sense signal, Yb is the second position sense signal, Xa is the first position signal, Xb is the second position signal, Y is a position sense signal, and X is a position signal.

3. The control method of claim 1, wherein the adjustment step uses a proportion control, an integration control, a derivative control, a proportional-integral-derivative (PID) control, a proportional-derivative (PD) control, a proportional-integral (PI) control or a fuzzy control to move the magnetic actuator from the actual position to the target position.

4. The control method of claim 1, wherein the interpolation is calculated in a microprocessor.

5. The control method of claim 4, wherein the microprocessor further comprises a driving module.

6. The control method of claim 5, wherein the driving module receives a pulse width modulation signal and outputs the first position signal, the second position signal or the target position signal to drive the magnetic actuator.

7. The control method of claim 6, wherein the driving module is a linear driving module.

8. The control method of claim 1, wherein the position sensor is a non-contact magnetic position sensor.

9. The control method of claim 8, wherein the non-contact magnetic position sensor is a Hall sensor or a magnetoresistive sensor.

10. The control method of claim 1, which is applied to an iris diaphragm actuator, or a Digital Light Processing (DLP) projector.

11. The control method of claim 1, wherein the first position signal and the second position signal are voltage signals or current signals.

12. The control method of claim 1, wherein the first position sense signal, the second position sense signal and the target position sense signal are stored in a microprocessor.

13. A magnetic actuator system comprising:
a magnetic actuator;
a light intercepting element;
a limiting element for restricting the motion of the light intercepting element;
a position sensor outputting a position sense signal in accordance with a position of a magnetic device of the magnetic actuator; and
a microprocessor driving the magnetic actuator and storing a first position signal, a first position sense signal, a second position signal, a second position sense signal, and an interpolation equation for defining two end points corresponding to the operative range of the magnetic actuator,
wherein the magnetic actuator is driven to move to a first position in accordance with the first position signal corresponding to one of the end points such that the light intercepting element contacts one side of the limiting element, the first position sense signal is generated by the position sensor, and the first position signal and the first position sense signal are stored to the microprocessor,
the magnetic actuator is driven to move to a second position in accordance with a the second position signal corresponding to the other one of the end points such that the light intercepting element contacts the other side of the limiting element, the second position sense signal is generated by the position sensor, and the second position signal and the second position sense signal are stored to the microprocessor,
the microprocessor performs an interpolation in accordance with the first position signal, the first position sense signal, the second position signal, the second position sense signal, and a target position signal so as to obtain a target position sense signal,
the magnetic actuator is driven to move to an actual position in accordance with the target position signal,
an actual position sense signal in accordance with the actual position is outputted by the position sensor, and
the magnetic actuator is driven to move from the actual position to a target position in accordance with the comparison of the target position sense signal and the actual position sense signal.

14. The magnetic actuator system of claim 13, wherein the interpolation equation is:

$$Y=Ya+(X-Xa)*(Yb-Ya)/(Xb-Xa)$$

where Ya is the first position sense signal, Yb is the second position sense signal, Xa is the first position signal, Xb is the second position signal, Y is the position sense signal, and X is a position signal.

15. The magnetic actuator system of claim 13, wherein the microprocessor further comprises a driving module for receiving a pulse width modulation signal and outputting the first position signal, the second position signal or the target position signal to drive the magnetic actuator.

16. The magnetic actuator system of claim 15, wherein the driving module is a linear driving module.

17. The magnetic actuator system of claim 13, wherein the position sensor is a non-contact magnetic position sensor.

18. The magnetic actuator system of claim 17, wherein the non-contact magnetic position sensor is a Hall sensor or a magnetoresistive sensor.

19. The magnetic actuator system of claim 17, which is applied to an iris diaphragm actuator, or a Digital Light Processing (DLP) projector.

* * * * *